US007887412B2

(12) United States Patent
Baerlocher

(10) Patent No.: US 7,887,412 B2
(45) Date of Patent: *Feb. 15, 2011

(54) GAMING DEVICE HAVING OFFER AND ACCEPTANCE GAME WITH HIDDEN OFFER

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 506 days.

This patent is subject to a terminal disclaimer.

(21) Appl. No.: 11/338,961

(22) Filed: Jan. 23, 2006

(65) Prior Publication Data

US 2006/0121966 A1 Jun. 8, 2006

Related U.S. Application Data

(63) Continuation of application No. 10/160,688, filed on May 31, 2002, now Pat. No. 7,001,273.

(51) Int. Cl.
*G06F 17/00* (2006.01)
*G06F 19/00* (2006.01)

(52) U.S. Cl. ............................ 463/25; 463/16; 463/20; 463/29; 273/138.1

(58) Field of Classification Search ............. 463/16–25, 463/29; 273/138.1, 139
See application file for complete search history.

(56) References Cited

U.S. PATENT DOCUMENTS

| | | | |
|---|---|---|---|
| 4,448,419 | A | 5/1984 | Telnaes |
| 4,582,324 | A | 4/1986 | Koza et al. |
| 4,624,459 | A | 11/1986 | Kaufman |
| 4,695,053 | A | 9/1987 | Vazquez, Jr. et al. |
| 4,991,848 | A | 2/1991 | Greenwood et al. |
| 5,178,390 | A | 1/1993 | Okada |
| 5,205,555 | A | 4/1993 | Hamano |
| 5,342,047 | A | 8/1994 | Heidel et al. |
| 5,456,465 | A | 10/1995 | Durham |
| 5,524,888 | A | 6/1996 | Heidel |
| 5,536,016 | A | 7/1996 | Thompson |

(Continued)

FOREIGN PATENT DOCUMENTS

EP 0874337 A1 10/1998

(Continued)

OTHER PUBLICATIONS

Let's Make a Deal. <URL: http://en.wikipedia.org/wiki/Let's_Make_a_Deal>.*

(Continued)

*Primary Examiner*—Melba Bumgarner
*Assistant Examiner*—Milap Shah
(74) *Attorney, Agent, or Firm*—K&L Gates LLP

(57) ABSTRACT

A gaming device including at least one displayed offer provided to a player, at least one input device for enabling the player to accept or reject each displayed offer provided to the player, and a hidden offer which the game does not reveal to the player during the acceptance or rejection of each of the provided displayed offers. The game provides and awards the hidden offer to the player if the player rejects each of the displayed offers. If the player accepts one of the provided displayed offers, the game awards the accepted offer to the player.

18 Claims, 14 Drawing Sheets

U.S. PATENT DOCUMENTS

| | | | | |
|---|---|---|---|---|
| 5,542,669 | A | 8/1996 | Charron et al. | |
| 5,560,603 | A | 10/1996 | Seelig et al. | |
| 5,611,535 | A | 3/1997 | Tiberio | |
| 5,711,525 | A | 1/1998 | Breeding | |
| 5,769,716 | A | 6/1998 | Saffari et al. | |
| 5,772,509 | A | 6/1998 | Weiss | |
| 5,775,692 | A | 7/1998 | Watts et al. | |
| 5,788,573 | A | 8/1998 | Baerlocher et al. | |
| 5,823,874 | A | 10/1998 | Adams | |
| 5,833,538 | A | 11/1998 | Weiss | |
| 5,848,932 | A | 12/1998 | Adams | |
| 5,851,148 | A | 12/1998 | Brune et al. | |
| 5,873,781 | A | 2/1999 | Keane | |
| 5,882,261 | A | 3/1999 | Adams | |
| 5,902,184 | A | 5/1999 | Bennett et al. | |
| 5,911,418 | A | 6/1999 | Adams | |
| 5,947,820 | A | 9/1999 | Morro et al. | |
| 5,951,397 | A | 9/1999 | Dickinson | |
| 5,964,463 | A | 10/1999 | Moore, Jr. | |
| 5,967,894 | A | 10/1999 | Kinoshita et al. | |
| 5,980,384 | A | 11/1999 | Barrie | |
| 5,984,781 | A | 11/1999 | Sunaga | |
| 5,997,400 | A | 12/1999 | Seelig et al. | |
| 5,997,401 | A | 12/1999 | Crawford | |
| 6,004,207 | A | 12/1999 | Wilson, Jr. et al. | |
| 6,015,346 | A | 1/2000 | Bennett | |
| 6,019,369 | A | 2/2000 | Nakagawa et al. | |
| 6,033,307 | A * | 3/2000 | Vancura | 463/20 |
| 6,056,642 | A | 5/2000 | Bennett | |
| 6,059,289 | A | 5/2000 | Vancura | |
| 6,059,658 | A | 5/2000 | Mangano et al. | |
| 6,062,980 | A | 5/2000 | Luciano | |
| 6,089,976 | A | 7/2000 | Schneider et al. | |
| 6,089,977 | A | 7/2000 | Bennett | |
| 6,089,978 | A | 7/2000 | Adams | |
| 6,093,102 | A | 7/2000 | Bennett | |
| 6,102,798 | A | 8/2000 | Bennett | |
| 6,120,031 | A | 9/2000 | Adams | |
| 6,126,541 | A | 10/2000 | Fuchs | |
| 6,126,542 | A | 10/2000 | Fier | |
| 6,142,873 | A | 11/2000 | Weiss et al. | |
| 6,142,874 | A | 11/2000 | Kodachi et al. | |
| 6,142,875 | A | 11/2000 | Kodachi et al. | |
| 6,146,273 | A | 11/2000 | Olsen | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,233 | B1 | 1/2001 | Sunaga et al. | |
| 6,174,235 | B1 | 1/2001 | Walker et al. | |
| 6,190,254 | B1 | 2/2001 | Bennett | |
| 6,190,255 | B1 | 2/2001 | Thomas et al. | |
| 6,203,429 | B1 | 3/2001 | Demar et al. | |
| 6,210,279 | B1 | 4/2001 | Dickinson | |
| 6,213,876 | B1 | 4/2001 | Moore, Jr. | |
| 6,224,483 | B1 | 5/2001 | Mayeroff | |
| 6,231,442 | B1 | 5/2001 | Mayeroff | |
| 6,231,445 | B1 | 5/2001 | Acres | |
| 6,261,177 | B1 | 7/2001 | Bennett | |
| 6,302,790 | B1 | 10/2001 | Brossard | |
| 6,305,686 | B1 | 10/2001 | Perrie et al. | |
| 6,309,300 | B1 | 10/2001 | Glavich | |
| 6,312,334 | B1 * | 11/2001 | Yoseloff | 463/25 |
| 6,328,649 | B1 | 12/2001 | Randall et al. | |
| 6,375,187 | B1 | 4/2002 | Baerlocher | |
| 6,398,218 | B1 | 6/2002 | Vancura | |
| 6,413,160 | B1 | 7/2002 | Vancura | |
| 6,435,511 | B1 | 8/2002 | Vancura et al. | |
| 6,443,837 | B1 * | 9/2002 | Jaffe et al. | 463/16 |
| 6,494,785 | B1 | 12/2002 | Gerrard et al. | |
| 6,506,118 | B1 | 1/2003 | Baerlocher et al. | |
| 6,514,141 | B1 | 2/2003 | Kaminkow et al. | |
| 6,569,015 | B1 | 5/2003 | Baerlocher et al. | |
| 6,572,471 | B1 * | 6/2003 | Bennett | 463/16 |
| 6,599,192 | B1 | 7/2003 | Baerlocher et al. | |
| 6,609,971 | B2 | 8/2003 | Vancura | |
| 6,620,045 | B2 | 9/2003 | Berman et al. | |
| 6,632,141 | B2 | 10/2003 | Webb et al. | |
| 6,645,074 | B2 | 11/2003 | Thomas et al. | |
| 6,648,754 | B2 | 11/2003 | Baerlocher et al. | |
| 6,659,864 | B2 | 12/2003 | McGahn et al. | |
| 6,692,355 | B2 | 2/2004 | Baerlocher et al. | |
| 6,719,632 | B2 | 4/2004 | Palmer et al. | |
| 6,722,981 | B2 | 4/2004 | Kaminkow et al. | |
| 6,722,982 | B2 | 4/2004 | Kaminkow et al. | |
| 6,758,750 | B2 | 7/2004 | Baerlocher et al. | |
| 6,776,711 | B1 | 8/2004 | Baerlocher | |
| 6,786,820 | B2 | 9/2004 | Gerrard et al. | |
| 6,793,579 | B2 | 9/2004 | Baerlocher et al. | |
| 6,796,905 | B2 | 9/2004 | Baerlocher et al. | |
| 6,808,452 | B2 | 10/2004 | Baerlocher et al. | |
| 6,808,454 | B2 | 10/2004 | Gerrard et al. | |
| 6,811,483 | B1 | 11/2004 | Webb et al. | |
| 6,852,030 | B2 | 2/2005 | Baerlocher et al. | |
| 6,890,257 | B2 | 5/2005 | Baerlocher | |
| 6,899,623 | B2 | 5/2005 | Baerlocher | |
| 6,942,566 | B2 | 9/2005 | Baerlocher et al. | |
| 6,960,132 | B2 | 11/2005 | Baerlocher et al. | |
| 6,966,833 | B2 | 11/2005 | Kaminkow et al. | |
| 6,971,953 | B2 | 12/2005 | Gerrard et al. | |
| 7,001,273 | B2 * | 2/2006 | Baerlocher | 463/20 |
| 7,192,349 | B2 * | 3/2007 | Baerlocher et al. | 463/25 |
| 7,264,545 | B2 * | 9/2007 | Maya et al. | 463/16 |
| 7,270,604 | B2 * | 9/2007 | Gerrard et al. | 463/16 |
| 2001/0046891 | A1 * | 11/2001 | Acres | 463/18 |
| 2002/0058544 | A1 * | 5/2002 | Perrie et al. | 463/16 |
| 2002/0142822 | A1 * | 10/2002 | Baerlocher et al. | 463/16 |
| 2003/0045349 | A1 * | 3/2003 | Hughs-Baird | 463/25 |
| 2003/0162584 | A1 | 8/2003 | Hughs-Baird et al. | |
| 2004/0023714 | A1 * | 2/2004 | Asdale | 463/22 |
| 2005/0054422 | A1 * | 3/2005 | Rothkranz et al. | 463/20 |

FOREIGN PATENT DOCUMENTS

| | | | |
|---|---|---|---|
| EP | 0926645 | A2 | 6/1999 |
| EP | 0944030 | A2 | 9/1999 |
| EP | 0945837 | A2 | 9/1999 |
| EP | 0981119 | A2 | 2/2000 |
| EP | 0984408 | A2 | 3/2000 |
| EP | 0984409 | A2 | 3/2000 |
| WO | WO 9732285 | | 9/1997 |
| WO | WO 00/12186 | | 3/2000 |

OTHER PUBLICATIONS

Press Your Luck Homepage. <URL: http://gscentral.net/pylhista.htm>.*

Press Your Luck—Bonehead Move Video. <URL: http://www.youtube.com/watch?v=ROZ0pkKrm5I&NR=1> Time frames 0:44 to 1:49.*

Addams Family Advertisement and Article written by IGT, Strictly Slots, published in 2000.

Adders and Ladders Advertisement written by Barcrest Ltd., published prior to 2000.

American Thunder Screen Shots written by IGT, published in 1998.

Big Bang Piggy Bankin Advertisement written by WMS Gaming, Inc., published prior to 2000.

Blackjack/Twenty-One Description written by Hoyle's Rules of Games, published in 1993.

Bonus Spin Red, White & Blue Advertisement written by IGT, published in 2000.

Bonus Times.Article written by Strictly Slots, published in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Chutes & Ladders Game Instructions written by Hasbro-Milton Bradley, published in 1999.
Description of Let's Make a Deal Television Show written by letsmakeadeal.com (2 pages), printed on Mar. 16, 2001.
Double Diamond Game Descriptions written by IGT printed on Mar. 21, 2001.
Double Up Poker Game Description written by IGT Undated.
Easy Street Advertisements and Articles written by Casino Data Systems, published in 2000.
Elvis Advertisement written by IGT, published in 1999.
Empire Game Advertisement written by AC Coin, published in 1996.
Fire and Fortune Article written by Strictly Slots, published in 2001.
Fox "N" Hound Advertisement written by IGT, published in 2000.
In Between Game Description written by IGT, available prior to 2000.
Jackpot Party Advertisements and Articles written by WMS Gaming, Inc., published in 1998.
Keep Your Hat on Advertisement written by Aristocrat, published in 2001.
Let's Make a Deal Advertisement written by Shuffle Master and IGT, published in 2001.
Let's Make a Deal Game Advertisement written by Bally Gaming Systems, published in 1999.
Let's Make a Deal geocities.com (2 pages), printed on Mar. 16, 2001.
Let's Make a Deal written by fortunecity.com (4 pages), printed on Mar. 21, 2001.
Let's Make a Deal written by geocities.com (10 pages), printed on Mar. 21, 2001.
Make a Deal written by Illinoislottery.com (1 page), printed on Mar. 21, 2001.
Let's Make a Deal written by math.uscd.edu/crypto/Monty/montybg.html, printed on Jan. 15, 2005.
Let's Make a Deal TV Series, www.tvtome.com/tvtome/servlet/ShowMainServlet/shoid-5457/>.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Monopoly Advertisements and Articles written by WMS Gaming, Inc., Strictly Slots, published in 1998, 1999, 2000.
Monopoly Party Train Article written by Strictly Slots, published in 2002.
Neon Nights written by IGT, published in 2000.
On the Money Article written by Strictly Slots, Casino Data Systems, published in Dec. 2000.
Polly & Roger Advertisement written by VLC, Inc., published in 2000.
Price is Right "Cliff Hangers" Description written by www.geocities.com; members.aol.com (web site), printed Mar. 21, 2001.
Price is Right "Showcases" Description written by schuminweb.com (web site), printed Mar. 16, 2001.
Psycho Cash Beast Club (including knockouts) written by Barcrest, published prior to 1998.
Punch-a-Bunch/The Punch Board The Price is Right [online]. 1978-Present. [retrieved on Sep. 17, 2002]. Retrieved from the Internet: URL:http://gscentral.net/punch.htm.
Richard Petty Advertisement written by IGT, published in 2000.
South Park—Dodgeball Advertisement written by IGT, published in 2000.
Showcase Showdowns. A Salute to Game Shows. [online]. [retrieved on Mar. 16, 2001] Retrieved from the Internet: URL: http://schuminweb.com/game-shows/shows/price-is-right/showcase-showdowns.htm.
Spell Binder Advertisement written by IGT, published in 2000.
Sphinx Advertisement written by Atronic Casino Technology, Ltd., published in 1997.
Take Your Pick Advertisement written by IGT/Anchor Gaming, published in 1999.
Take Your Pick Article written by Strictly Slots, published in Mar. 2001.
Texas Tea Advertisement written by IGT, published in 2000.
That's Too Much! The Price is Right. [online] Apr. 19, 2001-Present [retrieved on Oct. 16, 2003] Retrieved from the Internet: URL:http://gscentral.net/much.htm.
Temptation. The Price is Right [online] 1974-Present retrieved on Oct. 16, 2003. Retrieved from the Internet: URL:http://gscentral.net/tempt.htm.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat Advertisement written by WMS Gaming, Inc., published prior to 2000.
Top Dollar Game Advertisement written by IGT, published in 1998.
Totem Pole Advertisement written by IGT, published in 1997.
Treasure Wheel/Treasure Tunnel Advertisement written by Sigma Game, Inc., published prior to 2000.
Wheel of Fortune Advertisement written by IGT, published in 1998.
Wheel of Fortune Advertisement written by IGT, published in 1999.
Wheel Poker Article written by Strictly Slots (Anchor Games), published in Nov. 2000.
Winning Streak Web Site Description written by WMS Gaming Inc. (web site), printed on Mar. 21, 2001.
X Factor Advertisement and Website Page written by WMS Gaming, Inc., published in 1998.

* cited by examiner

GAMING DEVICE HAVING OFFER AND ACCEPTANCE GAME WITH HIDDEN OFFER

PRIORITY CLAIM

This application is a continuation of and claims the benefit of U.S. patent application Ser. No. 10/160,688, filed on May 31, 2002, now U.S. Pat. No. 7,001,273, the entire contents of which are incorporated herein.

CROSS REFERENCES TO RELATED APPLICATION

The present invention relates to the following U.S. applications by the assignee of this invention: "GAMING DEVICE HAVING AN OFFER/ACCEPTANCE GAME WITH MULTI-OFFER SYMBOL," Ser. No. 10/245,387; "GAMING DEVICE HAVING MULTIPLE ROUND BONUS SCHEME WITH RESIDUAL AWARDS," Ser. No. 10/241,248; "GAMING DEVICE HAVING AN IMPROVED OFFER/ACCEPTANCE GAME WHEREIN EACH OFFER IS BASED ON A PLURALITY OF INDEPENDENTLY GENERATED EVENTS," Ser. No. 10/244,134; "GAMING DEVICE HAVING AN OFFER AND ACCEPTANCE SELECTION BONUS SCHEME WITH A TERMINATOR AND AN ANTI-TERMINATOR," Ser. No. 10/644,447; "GAMING DEVICE HAVING AN AWARD EXCHANGE BONUS ROUND AND METHOD FOR REVEALING AWARD EXCHANGE POSSIBILITIES," Ser. No. 10/629,416; "GAMING DEVICE HAVING A DESTINATION PURSUIT BONUS SCHEME WITH ADVANCED AND SETBACK CONDITIONS," Ser. No. 10/660,075; "GAMING DEVICE HAVING SEPARATELY CHANGEABLE VALUE AND MODIFIER BONUS SCHEME," Ser. No. 10/767,484; "GAMING DEVICE HAVING AN AWARD OFFER AND TERMINATION BONUS SCHEME," Ser. No. 10/810,146; "GAMING DEVICE HAVING A BONUS ROUND WITH MULTIPLE RANDOM AWARD GENERATION AND MULTIPLE RETURN/RISK SCENARIOS," Ser. No. 10/865,713; "GAMING DEVICE HAVING OFFER/ACCEPTANCE ADVANCE THRESHOLD AND LIMIT BONUS SCHEME," Ser. No. 10/925,561; "GAMING DEVICE HAVING IMPROVED AWARD OFFER BONUS SCHEME," Ser. No. 10/937,664; "GAMING DEVICE HAVING IMPROVED AWARD OFFER BONUS SCHEME," Ser. No. 10/952,062; "GAMING DEVICE HAVING AN AWARD EXCHANGE BONUS ROUND AND METHOD FOR REVEALING AWARD EXCHANGE POSSIBILITIES," Ser. No. 10/982,518; "GAMING DEVICE HAVING RISK EVALUATION BONUS ROUND," Ser. No. 11/041,801; "GAMING DEVICE HAVING IMPROVED OFFER AND ACCEPTANCE BONUS SCHEME," Ser. No. 11/112,566; "GAMING DEVICE HAVING AN IMPROVED OFFER/ACCEPTANCE BONUS SCHEME," Ser. No. 11/194,037; "GAMING DEVICE HAVING AN IMPROVED OFFER/ACCEPTANCE BONUS SCHEME," Ser. No. 11/222,695; and "GAMING DEVICE HAVING OFFER ACCEPTANCE GAME WITH TERMINATION LIMIT," Ser. No. 11/256,417.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having an offer and acceptance bonus game with a hidden offer.

BACKGROUND OF THE INVENTION

Gaming devices, such as slot, poker, blackjack and keno, having primary and/or secondary or bonus games are well known. One well known bonus game provides a player with a series of award offers consisting of credits or dollars. The player may either accept each award offer or reject each award offer; however, the player must accept the final award offer. If the player accepts an award offer, the game provides the award offer to the player. If the player rejects the award offer, the gaming device provides another award offer to the player, as long as the current award offer is not the final award offer. The award offers are randomly determined from a series of award offers of differing values.

As illustrated in FIG. 3, the potential award offers 100 are displayed to the player (hereafter "displayed offers" 100), each award offer provided by the game is displayed in an offer display 102, the number of offers remaining are displayed in an offers remaining display 104, and accept and reject buttons 106 and 108, respectively, enable the user or player to accept or reject the offers.

Several different embodiments of this type of bonus scheme for a gaming device have been implemented in gaming machines of various types. This type of gaming device has achieved significant popularity in the gaming industry. Accordingly, there is a need for gaming devices having new bonus rounds related to this type of offer and acceptance scheme.

SUMMARY OF THE INVENTION

The present invention provides a gaming device having a new offer and acceptance game such as a bonus game having a plurality of displayed offers, one or more hidden offers and provided offers. Generally, a displayed offer includes an offer, the value of which is shown to the player. The bonus game may provide a displayed offer to the player. Different bonus rounds of the present invention preferably have different sets of displayed offers. Generally, a hidden offer includes an offer whose value is not known by or initially displayed to the player. The existence of a hidden offer in a bonus round may or may not be communicated to the player in each bonus round depending upon the embodiment as described below. Generally, a provided offer includes an offer actually made to the player that the player may accept or reject. The hidden offers of the present invention may or may not be provided to the player depending upon the embodiment, the random selection of the offer and which offers the player accepts or rejects in each bonus round as described below.

When a player accepts a provided offer, the game gives the offer to the player. That is, the offer ceases being an offer and becomes an award given to the player. Accepting a provided offer preferably ends the game or round of the present invention. When the player rejects a displayed offer that the game has provided to the player, the displayed offer is no longer available for acceptance. However, when the player rejects a hidden offer, the hidden offer may still be available for acceptance depending on the embodiment as described below.

In one preferred embodiment the present invention includes a gaming device having: (i) at least one displayed offer that the game provides to a player; (ii) at least one input device for enabling the player to accept or reject each provided offer; and (iii) a hidden offer which the player does not know about, or which the player does know about but does not know the value of during the acceptance or rejection of each of the displayed offers. In one alternative of this embodiment, the game actually provides the hidden offer to the player at the start of the game without revealing the value of the hidden offer to the player. That is, the player may initially accept the hidden offer without knowing the value of the hidden offer, whereby the game reveals the value of the hidden offer and awards the hidden offer to the player, or the player may reject the hidden offer to obtain other offers. If the player rejects the hidden offer, the offer remains provided or open but hidden, so that the player can accept the hidden offer at another time during the accept/reject sequence. The game ultimately discloses and awards the hidden offer to the player if the player rejects each of the displayed offers. If the player accepts one of the displayed offers, the game awards the accepted displayed offer to the player. That is, the player receives the value of the displayed offer.

In an alternative of this embodiment, the game does not initially provide the hidden offer to the player. That is, the game does not enable the player to accept or reject the hidden offer; rather, the game preferably informs the player that the hidden offer exists. If the player rejects each displayed and provided offer, the game reveals and awards the hidden offer to the player. That is, to receive the hidden offer, the player must reject each displayed offer that the game provides to the player.

Both alternatives include one or more random generation devices or mechanisms that select which potential offers to display and which potential offers to provide to the player. In one display sequence of the preferred embodiment, the game only displays an offer at the time when the game provides the offer to the player. Preferably, however, the game displays each potential non-hidden offer to the player throughout the acceptance or rejection of the provided offers and randomly selects one of these offers to provide to the player. The offer displays are preferably simulated, and the input devices are preferably player selectable areas of a touch screen. Alternatively, the game includes electromechanical displays and input devices, which are mounted to the gaming device.

The preferred embodiment also includes one or more random generation devices that select or generate, and, in one alternative of this embodiment, provide a hidden offer to the player before enabling the player to accept or reject a displayed offer. When the game enables the player to accept or reject the hidden offer at multiple times during the accept/reject sequence, the game informs the player of the existence of the hidden offer but does not display the value of the hidden offer. When the game only provides the hidden offer after the rejection of each displayed offer, the game also preferably discloses the existence of the hidden offer. Here, however, the game may alternatively give the player no indication of the existence of the hidden offer during acceptance and rejection of the displayed offers.

The game includes a preferably simulated display area in which the game eventually reveals the hidden offer. The preferred embodiment includes revealing the hidden offer after the acceptance or rejection of the displayed offers, regardless of whether the player accepts a displayed offer. Alternatively, the game may only reveal the hidden offer when the player rejects each of the displayed offers, but not when the player accepts a displayed offer.

One method of operating a gaming device of the preferred embodiment therefore includes the steps of: (i) providing a plurality of displayed offers to a player; (ii) enabling the player to accept or reject the displayed offers; (iii) generating a hidden offer before or after step (i) and hiding or not revealing the hidden offer from the player during step (ii); (iv) awarding a displayed offer to the player if the player accepts one of the displayed offers; and (v) awarding the hidden offer to the player if the player rejects each of the displayed offers. The method includes displaying each potential offer throughout step (ii) or only displaying each offer when it is provided to a player.

The method alternatively includes the step of enabling the player to accept the hidden offer at any time during the accept/reject sequence. The method further alternatively includes the step of informing the player of the existence of the hidden offer (without revealing the value of the hidden offer) before acceptance or rejection of the displayed offer, and revealing the hidden offer after rejection and/or acceptance of the displayed offers.

In one alternative embodiment of the present invention, the gaming device includes: (i) a plurality of displayed potential offers; (ii) at least one displayed offer that the game provides to a player; (iii) at least one input device for enabling the player to accept or reject each provided offer; and (iv) a hidden offer that the game selects and randomly provides to the player at any time during the accept/reject sequence. If the player accepts one of the displayed offers, the game awards the accepted offer to the player. The player is enabled to accept the hidden offer only when the game provides the hidden offer to the player.

This alternative embodiment also includes one or more random generation devices that generate or select and provide the displayed offers to the player. In this embodiment, the game displays the potential offers to the player at all times. The potential offer displays and the provided offer display are again preferably simulated and the input devices are preferably player selectable areas of a touch screen.

This alternative embodiment also includes one or more random generation devices that select or generate the hidden offer for the player at or before the time that the game selects and displays the potential offers to the player. The game preferably informs the player of the existence of the hidden offer but does not display the hidden offer until randomly providing the offer at some point during the accept/reject sequence. The game alternatively gives the player no indication of the existence of the hidden offer until randomly providing the hidden offer to the player.

The game again includes a preferably simulated display area in which the game randomly displays and provides the hidden offer. This alternative embodiment includes revealing the hidden offer when the player accepts a displayed offer. The game alternatively only reveals the hidden offer when the game randomly provides the hidden offer to the player.

Another method of operating a gaming device of the alternative embodiment therefore includes the steps of: (i) displaying a plurality of potential offers; (ii) providing a plurality of displayed offers to a player; (iii) enabling the player to accept or reject the provided offers; (iv) randomly generating a hidden offer at some point during acceptance and rejection of the displayed offers; (v) awarding a displayed offer to the player if the player accepts the displayed offer; and (vi) providing the hidden offer to the player if the player accepts the hidden offer. This method includes displaying each potential offer throughout the game. This method further includes the steps of informing the player of the existence (but not the value) of the hidden offer before or during acceptance or rejection of the displayed offers and revealing the hidden offer after the acceptance of a displayed offer.

It is therefore an advantage of the present invention to provide a gaming device having an offer and acceptance game that includes an undisclosed or hidden offer.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
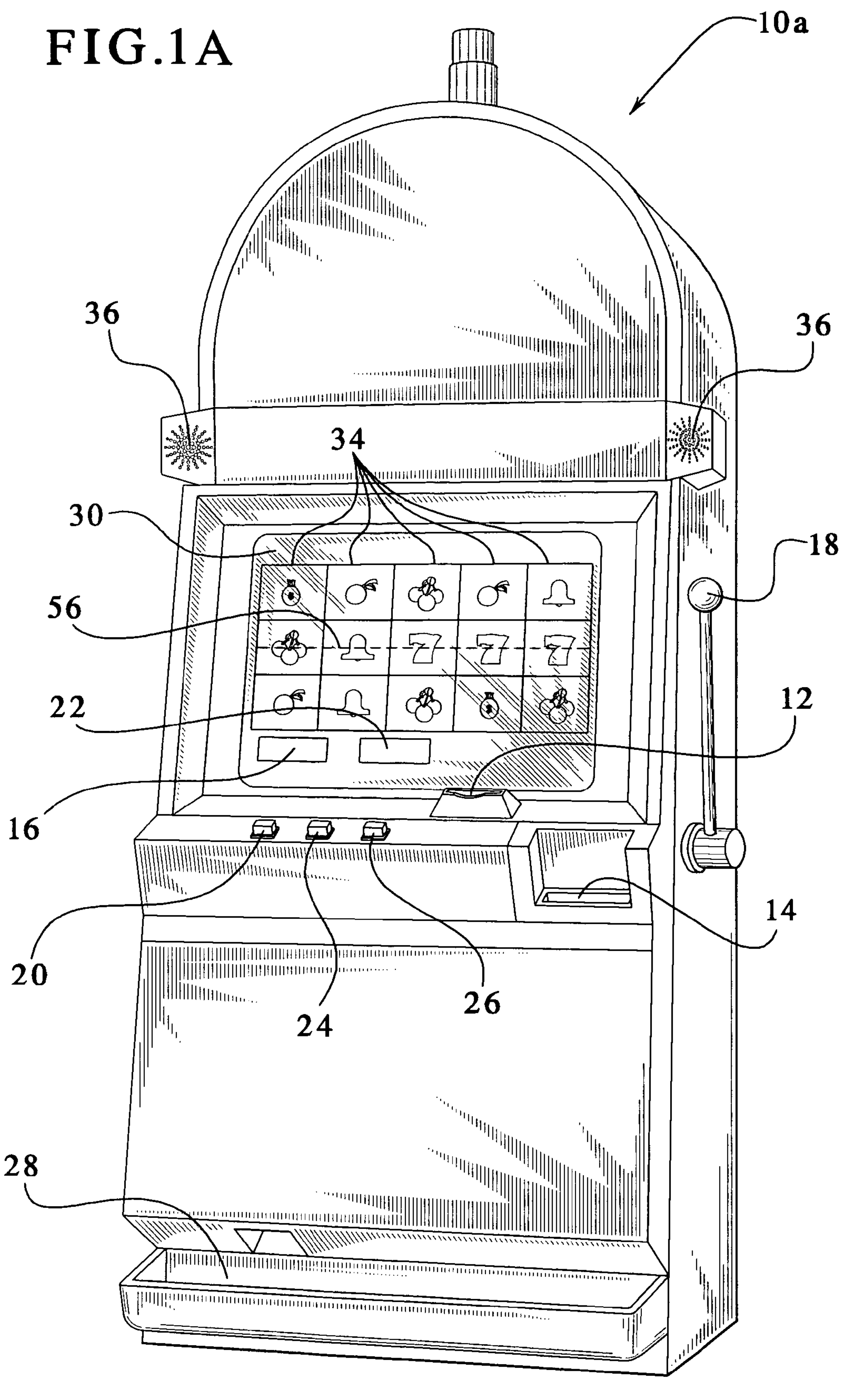
FIGS. 1A and 1B are perspective views of alternative embodiments of the gaming device of the present invention.
Figure 1B:
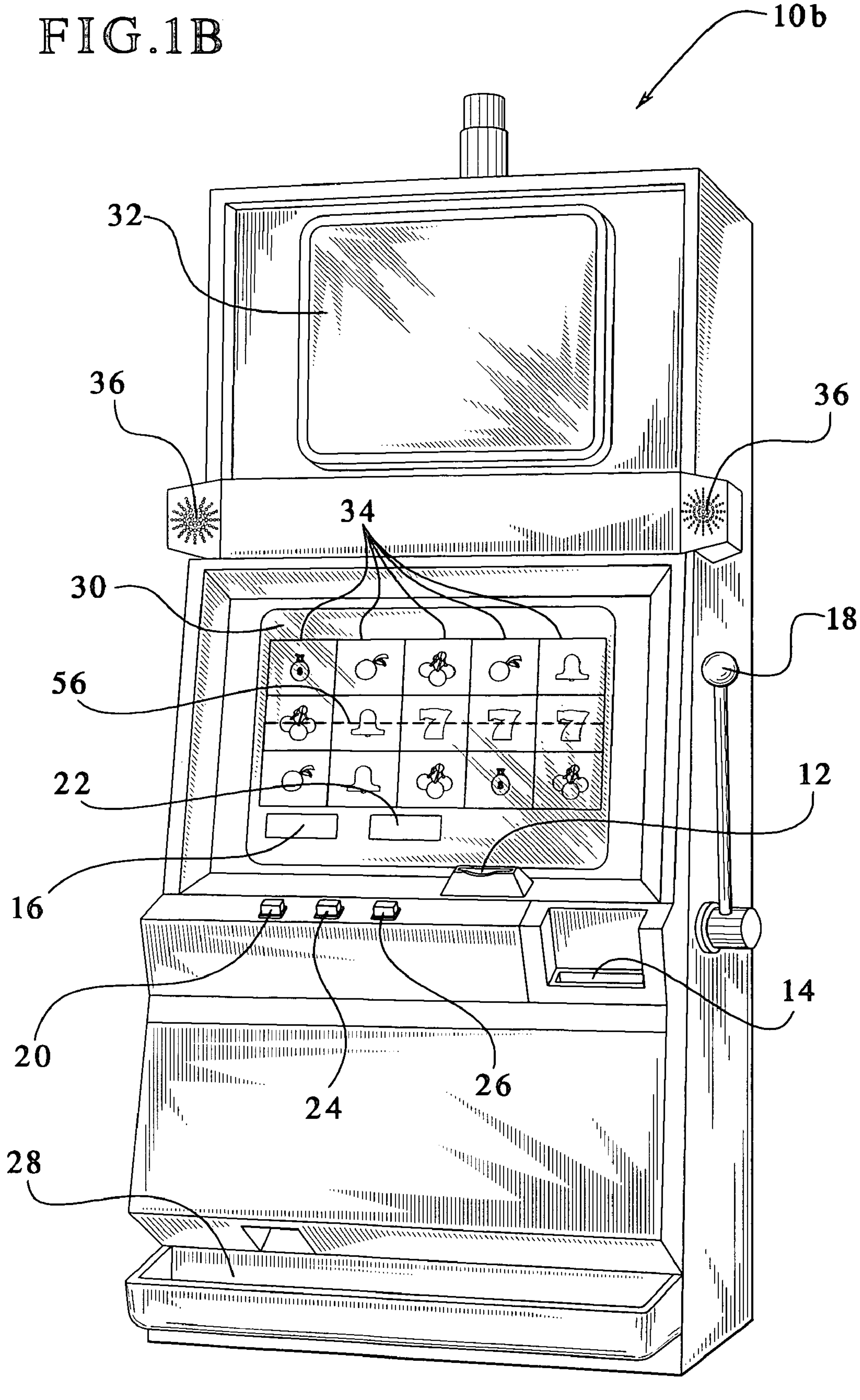

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game may be slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 may include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
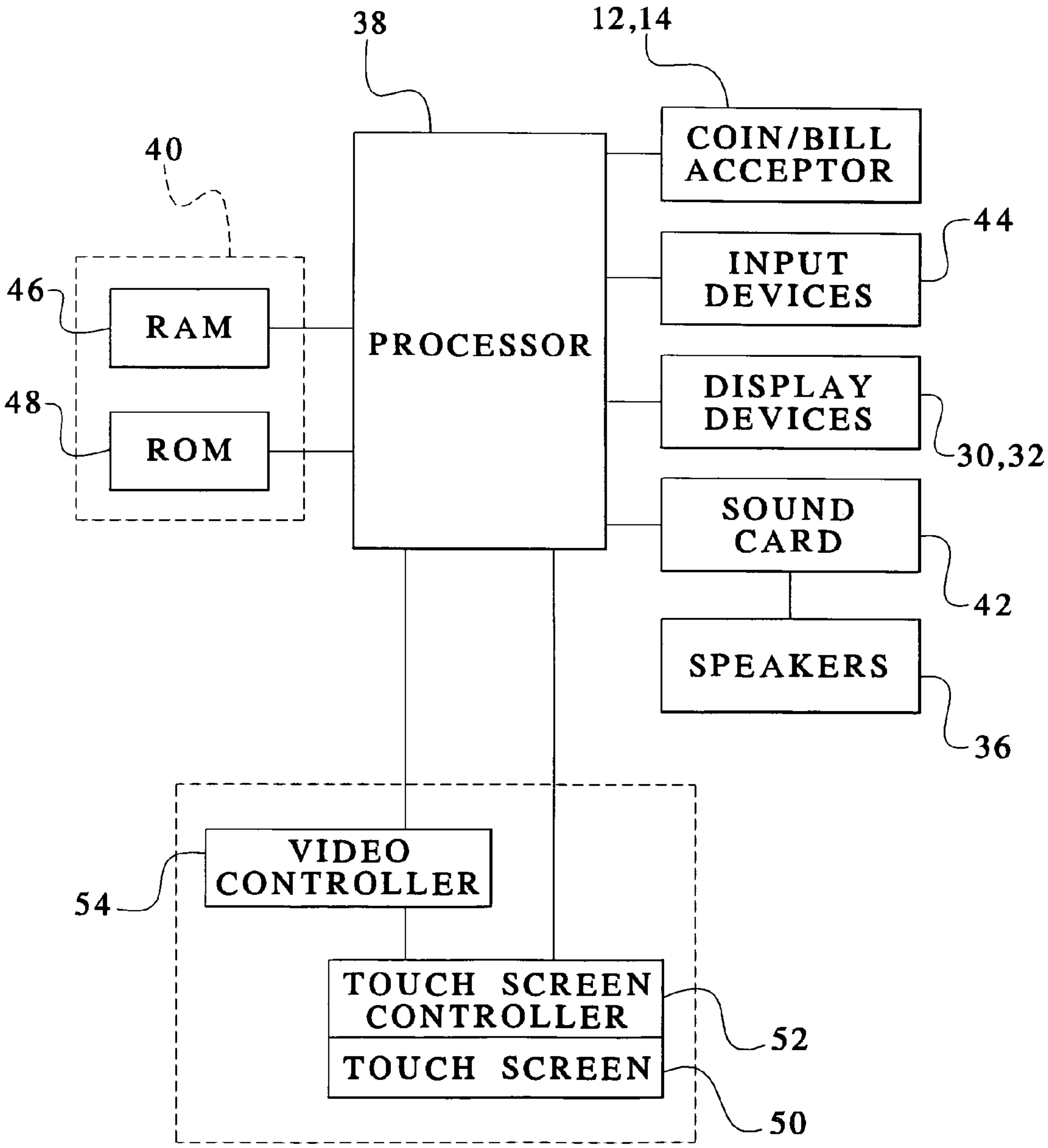
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively or individually referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that preferably automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

Offer/Acceptance Bonus Game with Hidden Offer

Figure 3:
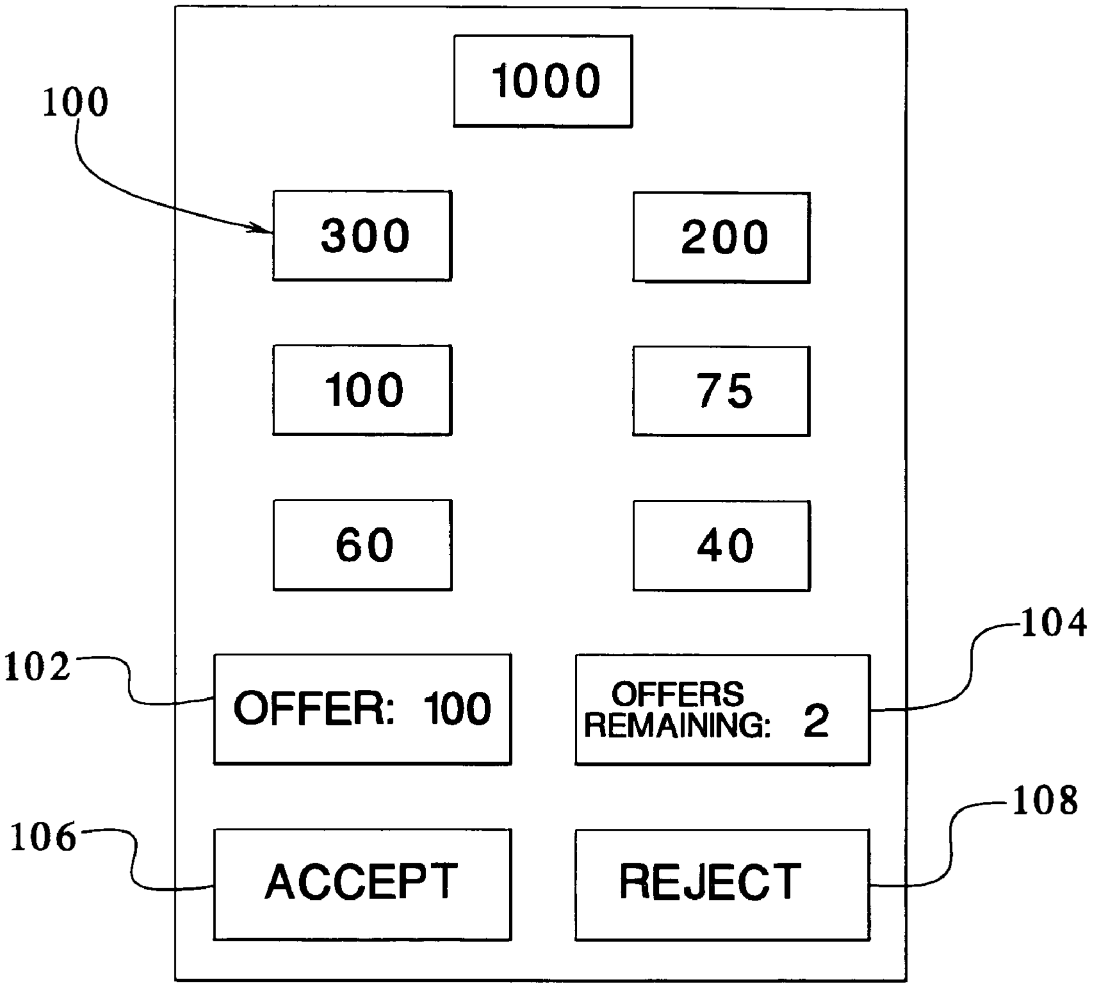
FIG.3 (PRIOR ART)
FIG. 3 is a front elevational view of a prior art offer and acceptance game.
Figure 4A:
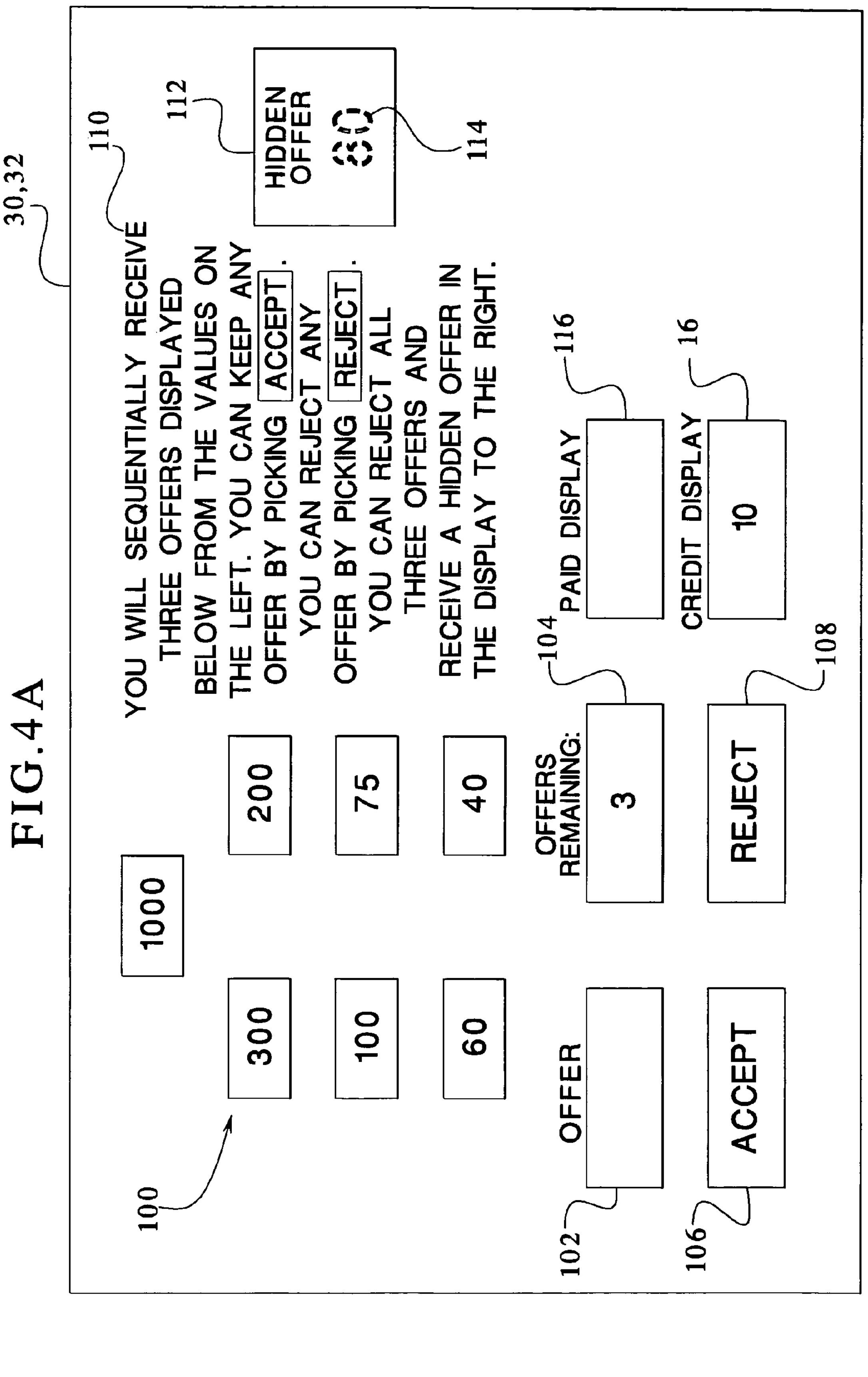
FIGS. 4A through 4E are front elevational views of one of the display devices of FIGS. 1A and 1B illustrating one preferred embodiment, wherein the game enables the player to accept or reject a hidden offer at any time during acceptance or rejection of the displayed offers provided to a player or after the rejection of each displayed offer.

Referring now to FIG. 4A, one preferred embodiment is illustrated on one of the display devices 30 or 32 having each of the prior art components of FIG. 3 and the components of the present invention. Specifically, the preferred embodiment includes the potential or displayed offers 100, the provided offer display 102 which shows a provided offer, the offers remaining display 104 and the accept and reject input devices 106 and 108, respectively, of FIG. 3. Additionally, the preferred embodiment includes a hidden offer message 110, a hidden offer display 112 and a hidden offer 114 (shown in phantom), which is known to the game but hidden from the player. In certain instances, the display devices 30 or 32 of the preferred embodiment include other indicators and input devices (not illustrated) associated with the base games of slot, poker, blackjack, keno, etc. or with a stand alone embodiment.

The preferred embodiment also includes a paid display 116 and a simulated credit display 16. The paid display 116 indicates the value of an offer paid to the player, e.g., an accepted offer, and is distinguishable from the credit display 16, which shows the recently paid offer plus the player's previous total number of awards or credits. In the example beginning with FIG. 4A, the player begins a game of the present invention with ten awards or credits from some other gaming activity, as indicated by the credit display 16. The game has not yet paid the player any awards, as indicated by the paid display 116.

The game preferably displays the potential offers 100, the displays 102, 104, 112, 116 and 16 and other theme building indicia (not illustrated) on a video monitor. The game preferably employs a touch screen 50 and a touch screen controller 52, such that the accept and reject input devices 106 and 108 are separate player selectable areas on the video monitor adapted to send discrete inputs to the processor 38 or computer. These inputs are separate from the inputs sent by other buttons or input devices. The game alternatively provides one or more lighted mechanical indicators for the displays 102, 104, 112, 116 and 16 and employs separate electromechanical input devices 44 (FIG. 2), similar to the bet one button 24 or the cash out button 26, for the accept and reject input devices.

The displayed offers 100 and the hidden offer 114 include game credits, game credit modifiers such as multipliers or represent other items of value such as a number of picks from a prize pool. The offers 100 and 114 include having any value desired by the implementor. FIG. 4A includes displayed offers ranging from forty to one thousand and a hidden offer 114 of eighty (the value of which is hidden from the player). The present invention includes providing any suitable desired displayed offer range, having any average value, and any hidden offer 114, having any relative value relationship to the displayed offer range. The game preferably changes or varies the relationship between the hidden offer 114 and displayed offer range, so that the player does not become conditioned to always reject or always keep the displayed offers 100. The game may also not provide a hidden offer in some games, such that if a player plays the game often, the player will not know which game will include a hidden offer.

Before providing a displayed offer to the player in the offer display 102, the processor 38 or computer employs one or more well known random generation devices (not illustrated) and randomly generates or selects and displays the displayed offers from a prize pool (not illustrated). In this manner, the preferred embodiment varies the displayed offers 100 from game to game. The game implementor weights the prize pools via selection percentages, or otherwise structures the offer entries of the pool to achieve a desired average value distribution for the displayed offers 100. The present invention alternatively includes providing the same set or choosing from a number of sets of displayed offers 100 in each game of the present invention.

In the preferred embodiment, the game does not have to display the potential offers 100 all at once as seen in FIG. 4A. Rather, the game includes displaying an offer when providing the offer in the provided offer display 102, whereby the player accepts or rejects the provided offer.

The above distinction creates two separate decisions for the player. When the game displays each of the displayed offers 100 while simultaneously providing one of the offers to the player, the player weighs the provided offer against the remaining displayed offers 100 and the knowledge, if any, of the unknown hidden offer 114. When the game only displays the provided offer in the provided offer display 102, the player weighs the provided offer against the player's knowledge, if any, of the yet to be displayed offers 100 and the unknown hidden offer 114. As stated below, the game preferably takes steps to inform the player of the hidden or unknown offer 114.

In an alternative embodiment where the game initially provides the hidden offer to the player, i.e., enables the player to accept the hidden offer once or at multiple times during the accept/reject sequence of the displayed offers, the processor 38 or computer also employs one or more well known random generation devices (not illustrated) and randomly generates, but does not initially display, the hidden or unrevealed offer 114 from a prize pool (not illustrated) before providing the initial displayed offer. In another alternative embodiment where the game does not provide the hidden offer to the player until the player rejects each displayed offer, the game includes randomly generating (but not displaying) the hidden offer 114 at any time prior to or after the player's acceptance of a displayed offer 100 or the player's rejection of each displayed offer 100.

When the game initially provides the hidden offer to the player, i.e., enables the player to accept the hidden offer 114 at multiple times during the accept/reject sequence, the audio, visual or audiovisual message 110 informs the player of the existence of the hidden offer 114, but does not display or disclose the value of the hidden offer. When the game does not provide the hidden offer 114 to the player until the player rejects each offer, the game also preferably displays the message 110. In this alternative, however, the game also includes giving the player no indication of the existence of the hidden offer 114 before or during the acceptance or rejection of the displayed offers 100. In FIG. 4A, the message 110 also discloses that the player will receive three displayed offers 100, as further indicated in the offers remaining display 104, that the player can accept any displayed offer 100 by picking the accept input device 106, and that the player can reject any offer by picking the reject input device 108.

The message 110 of FIG. 4A also discloses one alternative of the preferred embodiment, wherein the game provides a hidden offer 114 if the player rejects all three displayed offers. In the other alternative of the preferred embodiment, the message 110 would instead disclose that the game has initially provided a hidden offer to the player, which the player may accept in lieu of one of the displayed offers. In this alternative, the game includes the hidden offer display 112, or some other input device, functioning as an accept hidden offer input device in the same manner that the accept input device 106 functions for the offers provided to the player in the offer display 102. In either case, the preferred embodiment includes providing any number of displayed offers and is not limited to the three herein disclosed.

Figure 4B:
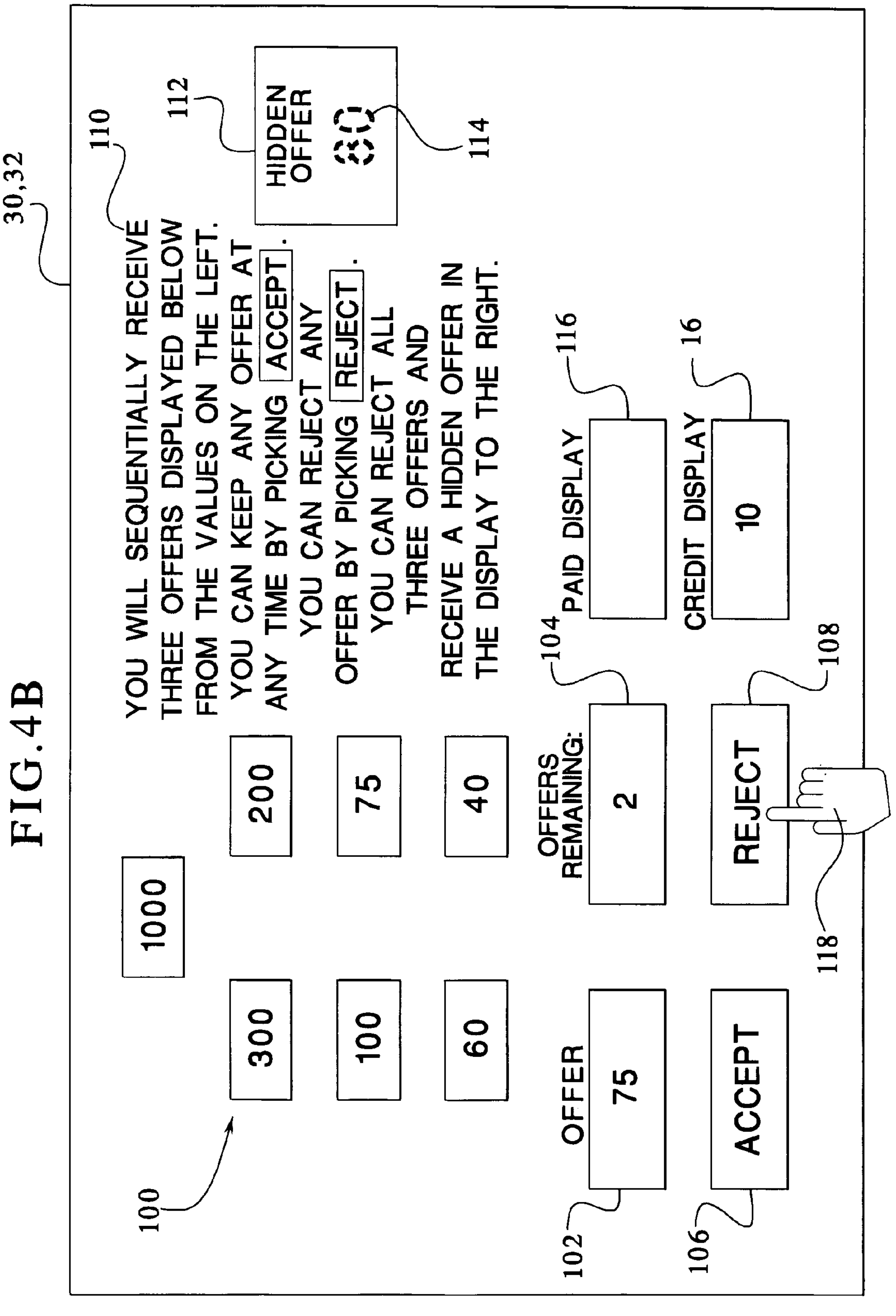
Figure 4C:
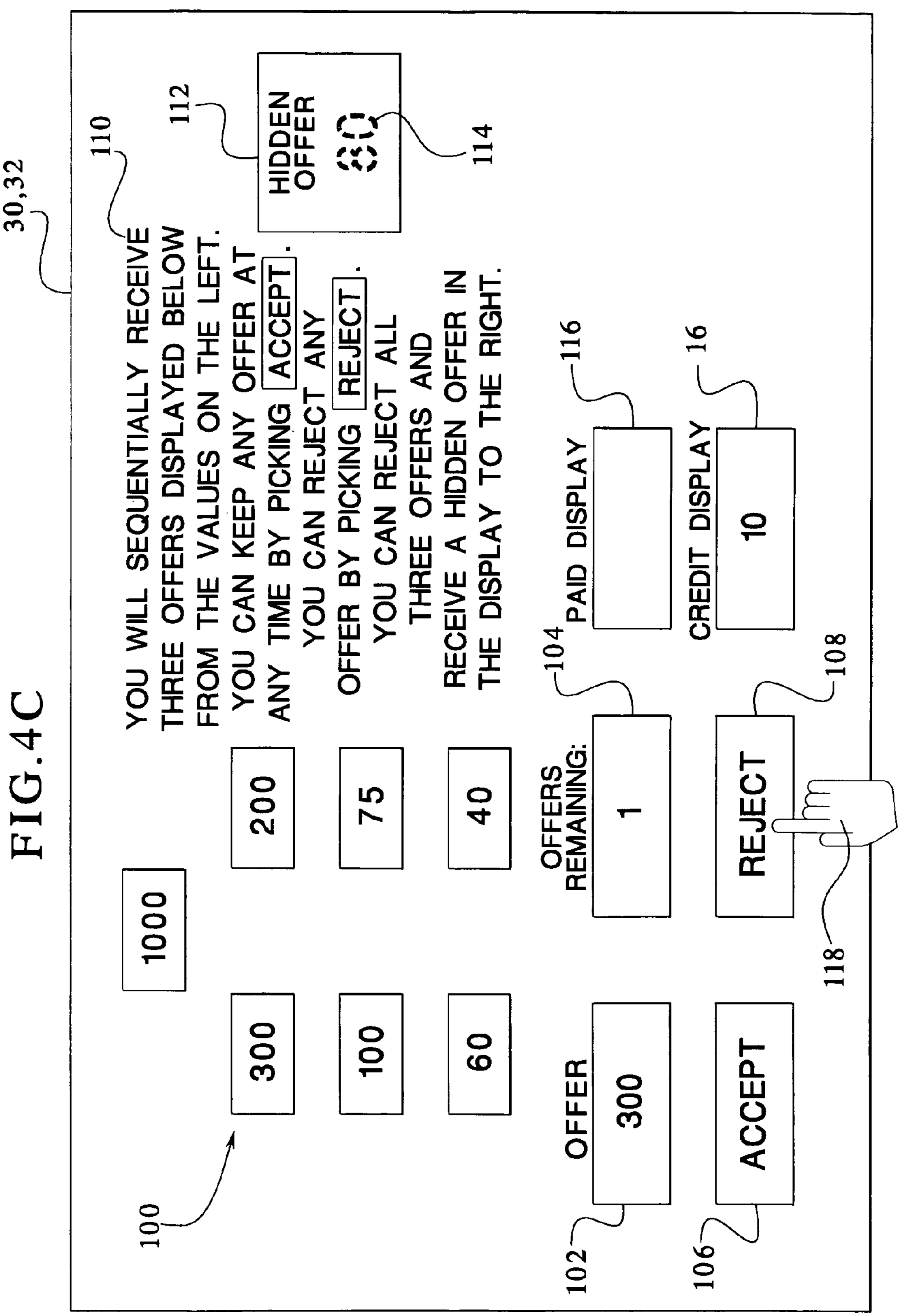
Figure 4D:
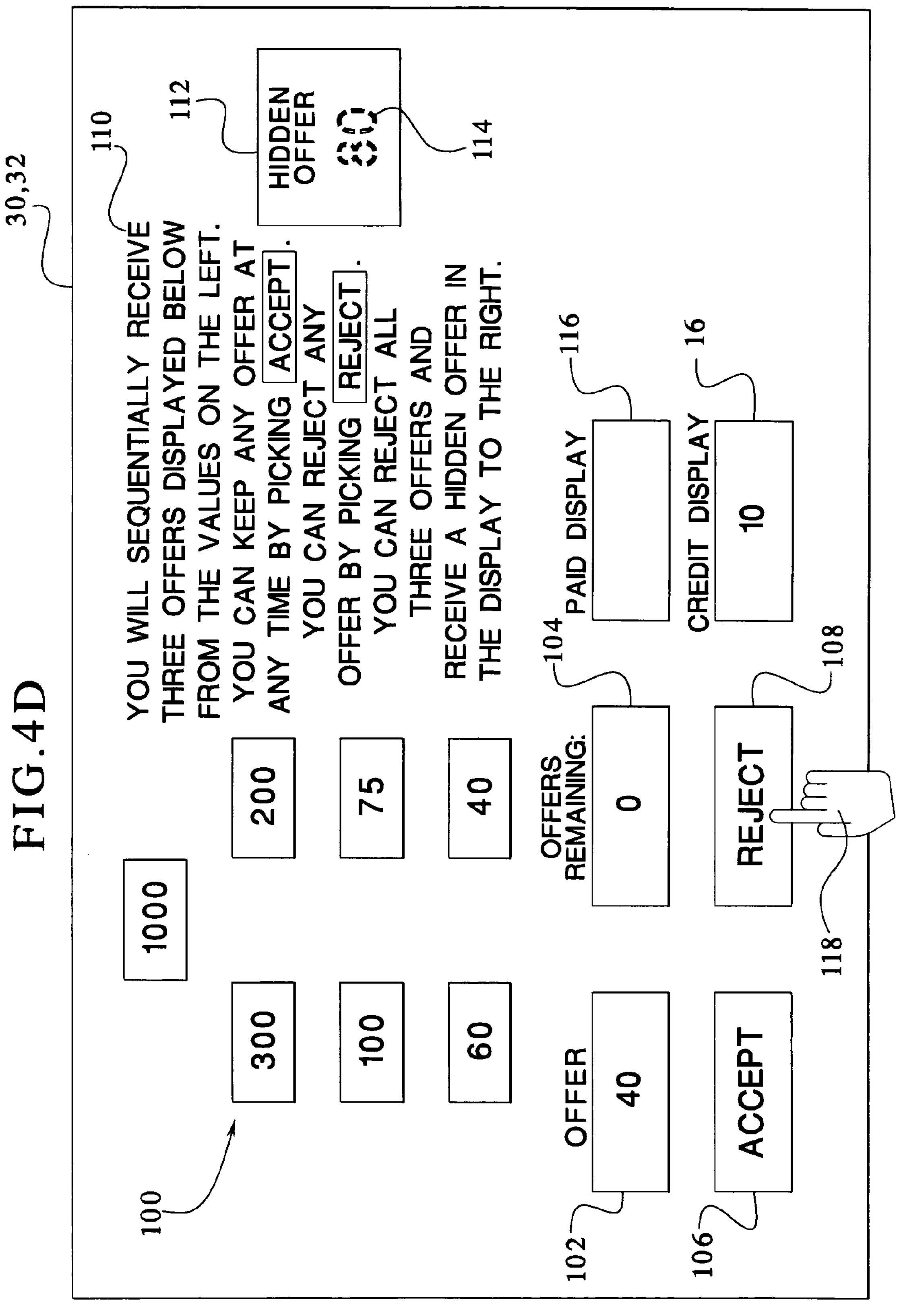

Referring now to FIG. 4B, in an example of the alternative wherein the game does not provide the hidden offer 114 until after the rejection of each of the displayed offers, upon the selection of a start-up input device (not shown) or after a predetermined amount of time, the game randomly provides a first displayed offer 100 of seventy-five to the player in the offer display 102 and decreases the offers remaining in the display 104 by one. The player 118 rejects this offer as illustrated. In FIG. 4C, the game randomly provides a second displayed offer 100 of three hundred to the player and decreases the offers remaining by one. The player 118 rejects this offer as illustrated. In FIG. 4D, the game randomly provides a third displayed offer 100 of forty to the player and decreases the offers remaining by one. The player 118 again rejects this final displayed offer as illustrated. The offers remaining display 104 illustrates that no offers remain. In this alternative, the game includes generating the hidden offer 114 at any time up to this point in the game.

Figure 4E:
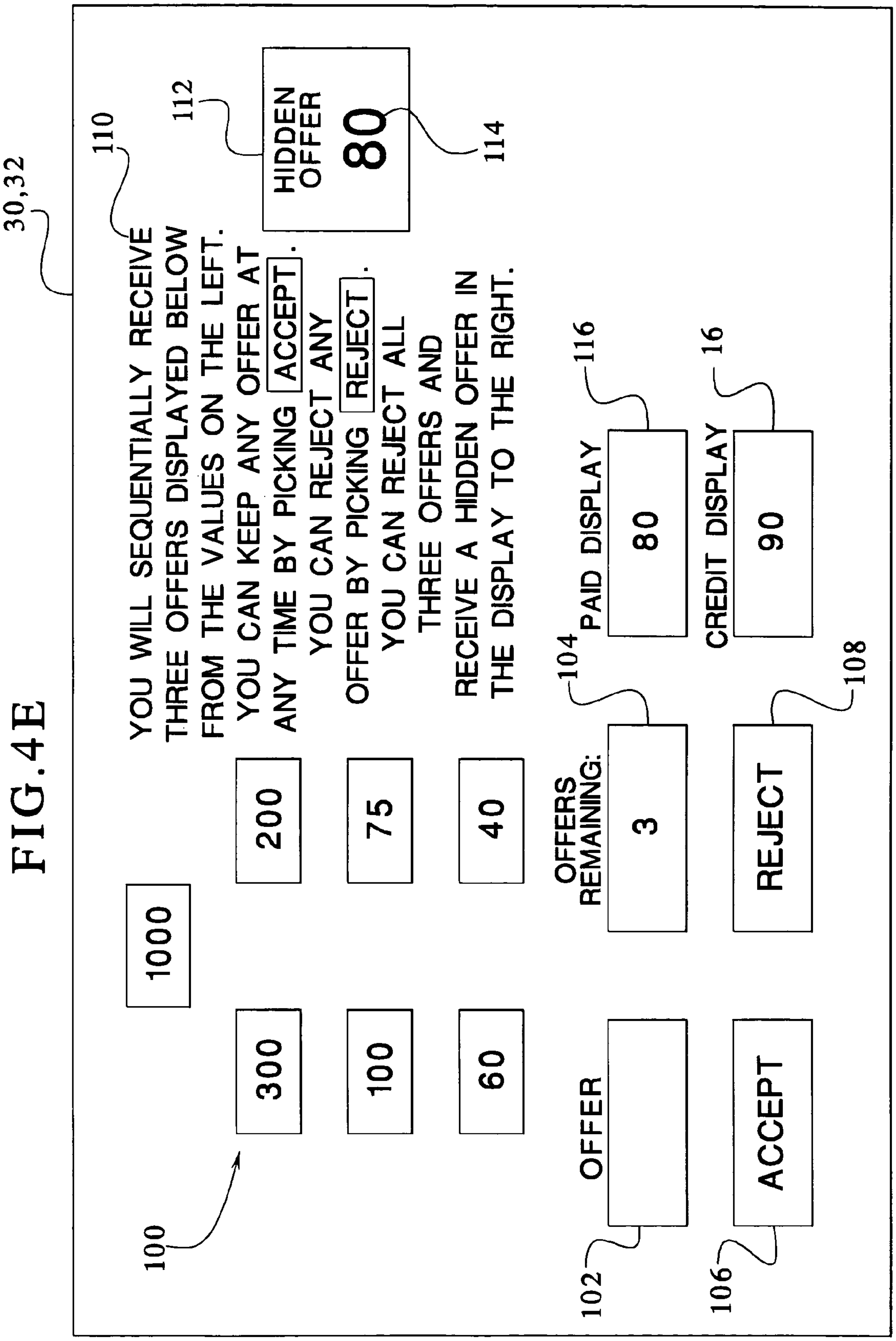

In FIG. 4E, the game reveals and provides the hidden offer 114 of eighty (now shown) in the hidden offer display 112. The game awards the eighty awards of the hidden offer 114 to the player, as illustrated in the paid display 116, and updates the player's total credits, as illustrated in the credit display 16. In this alternative, knowing the rules of the game provided in the message 110, the player's rejection of the final displayed offer depicted in FIG. 4D is also the acceptance of the hidden offer 114. Therefore, no separate hidden offer input device is required. However, this alternative still includes employing the hidden offer display 112, or some other input device, for accepting the hidden offer.

This alternative includes revealing the hidden offer 114 after the acceptance or rejection of the displayed offers, regardless of whether the player accepts a displayed offer or rejects each of the displayed offers. This alternative only reveals the hidden offer when the player rejects each of the displayed offers 100, i.e., when the game provides the hidden offer 114 and when the player accepts the hidden offer, but not when the player accepts a displayed offer.

In an example of this alternative, wherein the game initially provides the hidden offer 114 to the player, the game includes displaying a message (not illustrated), similar to the message 110, informing the player of the hidden offer 114 and informing the player that the player may accept the hidden offer 114 or reject the hidden offer 114 for one of the displayed offers. The game preferably enables the player to reject the hidden offer 114 by selecting the reject input device 108 or accept the hidden offer 114 by selecting the hidden offer display 112, when configured as a touch screen input device, or using some other suitable input device as described above.

If the player initially rejects the hidden offer 114, the game provides one of the displayed offers in the offer display 102. The game thereafter includes still providing the hidden offer 114 for one or more accept/reject sequences. If the game still provides the hidden offer, the player chooses to accept the hidden offer 114, to accept a displayed offer 100 or to reject both offers via the reject input device 108. In this alternative, the game includes: (i) providing the hidden offer 114 for each of the provided displayed offers; (ii) providing the hidden offer 114 for a predetermined percentage of the provided displayed offers 100 (e.g., the game informs the player that it will provide the hidden offer for two of three displayed offers); or (iii) providing the hidden offer 114 for a randomly determined number of provided displayed offers 100, so that the player does not know when the game will remove the hidden offer opportunity.

Figure 5A:
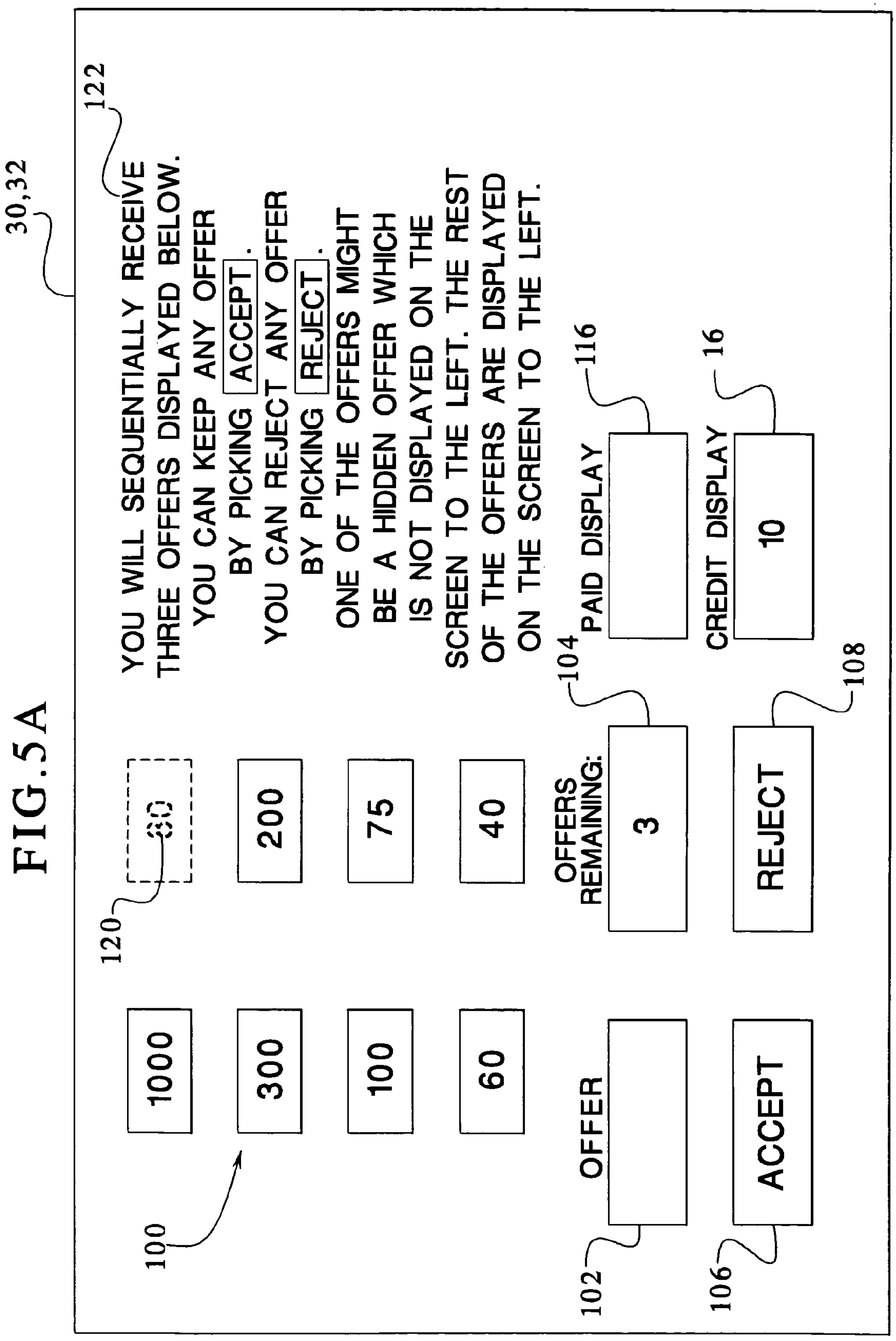
FIGS. 5A through 5E are front elevational views of one of the display devices of FIGS. 1A and 1B illustrating one alternative embodiment, wherein the game randomly provides a hidden offer to the player at some point during acceptance or rejection of the displayed offers provided to the player.

Referring now to FIG. 5A, one alternative embodiment operates similar to the embodiments disclosed in FIGS. 4A through 4E, except that the game provides a hidden offer 120 (shown in phantom) at a randomly determined time during the accept/reject sequence. The game preferably only provides the hidden offer 120 once. That is, if the player rejects the hidden offer 120, the opportunity is permanently lost. In this respect, the hidden offer 120 operates similar to any of the provided displayed offers 120.

As in FIGS. 4A through 4E, the alternative embodiment of FIGS. 5A through 5E includes the displayed offers 100, the offer display 102, the offers remaining display 104 and the accept and reject input devices 106 and 108, respectively, of FIG. 3. Additionally, the alternative embodiment includes a hidden offer message 122, which informs the player that a hidden offer may be provided among the displayed offers. The alternative embodiment includes generating the hidden offer 120 at any time up to or after the time that the game randomly provides the final displayed offer 100.

The alternative embodiment also includes the paid display 116 and the simulated credit display 16. The game preferably displays the alternative embodiment, including the displayed offers 100, the displays and other theme building indicia (not illustrated) on a video monitor and employs a touch screen 50 (FIG. 2) for the accept and reject buttons 106 and 108, respectively. This embodiment alternatively employs electromechanical displays and input devices 44 (FIG. 2).

The displayed offers 100 and the hidden offer 120 again include game credits, credit multipliers or represent other items of value such as a number of picks from a prize pool. The offers 100 and 120 include having any value desired by the implementor. This embodiment includes providing any displayed offer range, having any average value, and any hidden offer 120, having any relative value relationship to the displayed offer range.

Before providing a displayed offer to the player in the offer display 102, the processor 38 or computer employs one or more well known random generation devices (not illustrated) and randomly generates and displays the displayed offers 100 or maintains one or more predetermined sets of offers as above. This embodiment preferably simultaneously displays each possible displayed offer 100 to the player at all times during the accept/reject sequence.

The audio, visual or audiovisual message 122 informs the player of the existence of the hidden offer 120, but does not display or disclose the value of the hidden offer, which may or may not have been generated. In FIG. 5A, the message 122 also discloses that the player will receive three offers, as indicated in the offers remaining display 104, that the player can accept any offer by picking the accept button 106, that the player can reject any offer by picking the reject button 108 and that the game can randomly generate a hidden offer 120 at some point during the accept/reject sequence, i.e., as one of the three provided offers. This alternative embodiment includes providing any number of displayed offers 100 and is not limited to three. The game also includes providing any number of hidden offers 120 and is not limited to one.

Figure 5B:
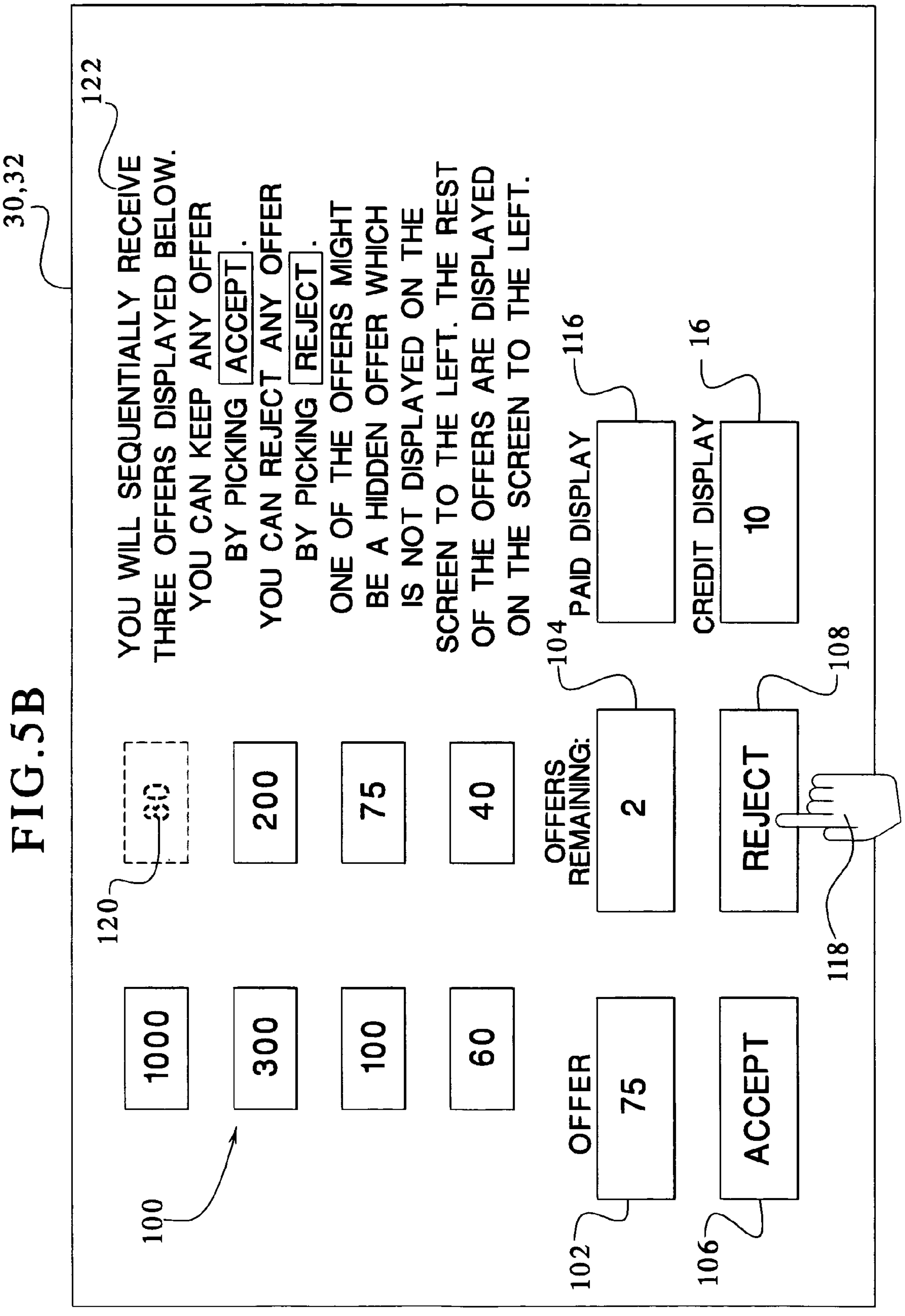
Figure 5C:
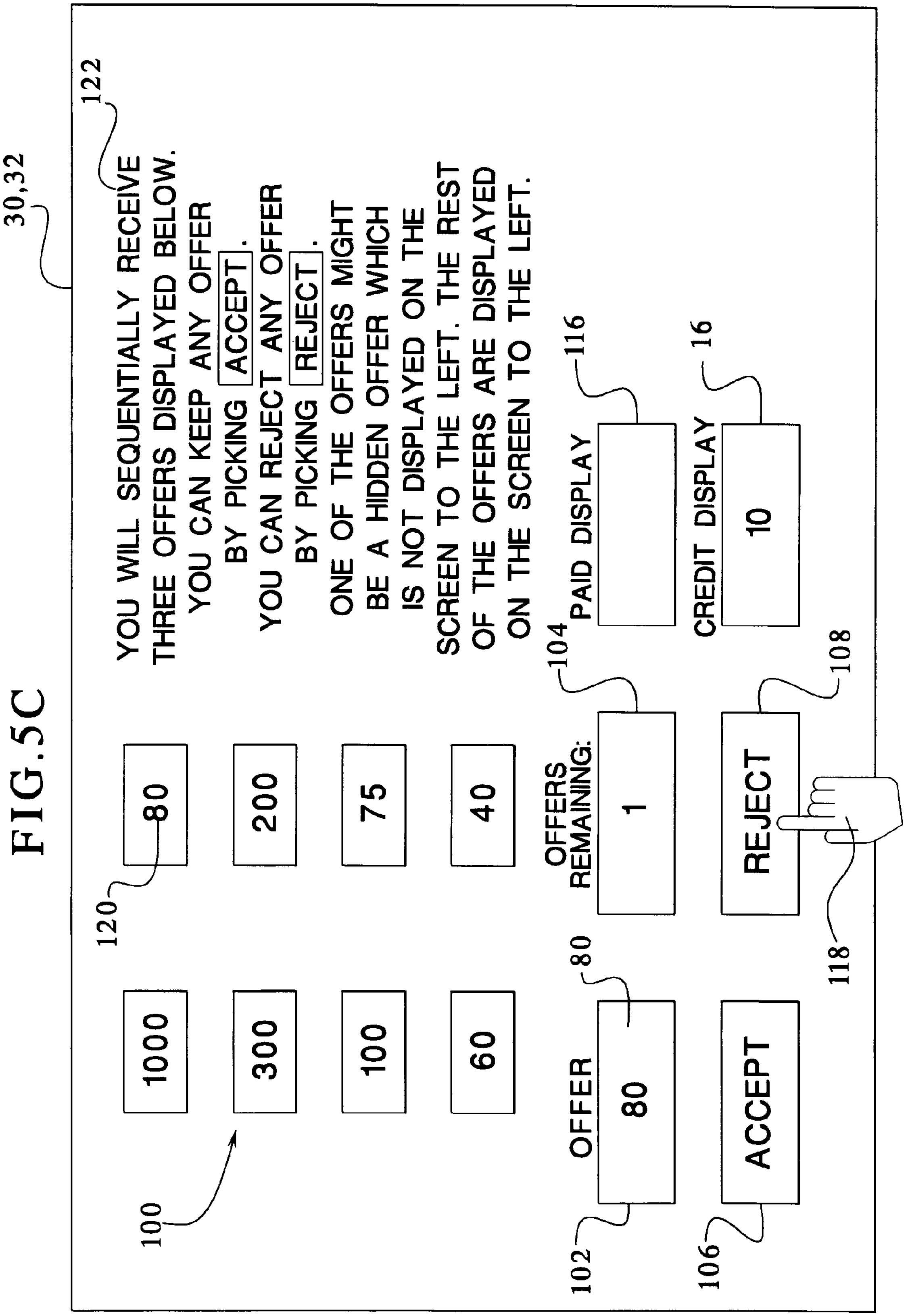
Figure 5D:
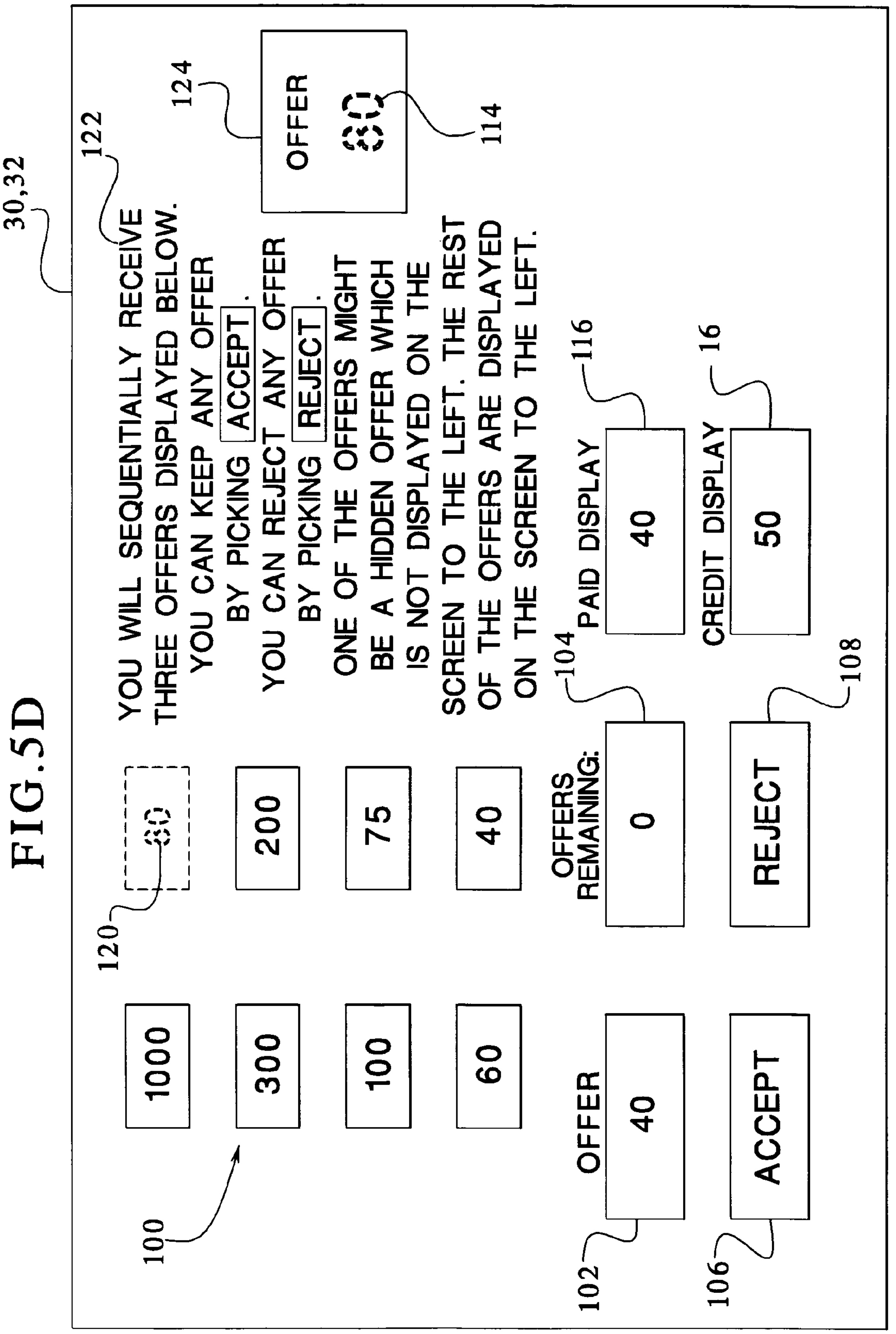
Figure 5E:
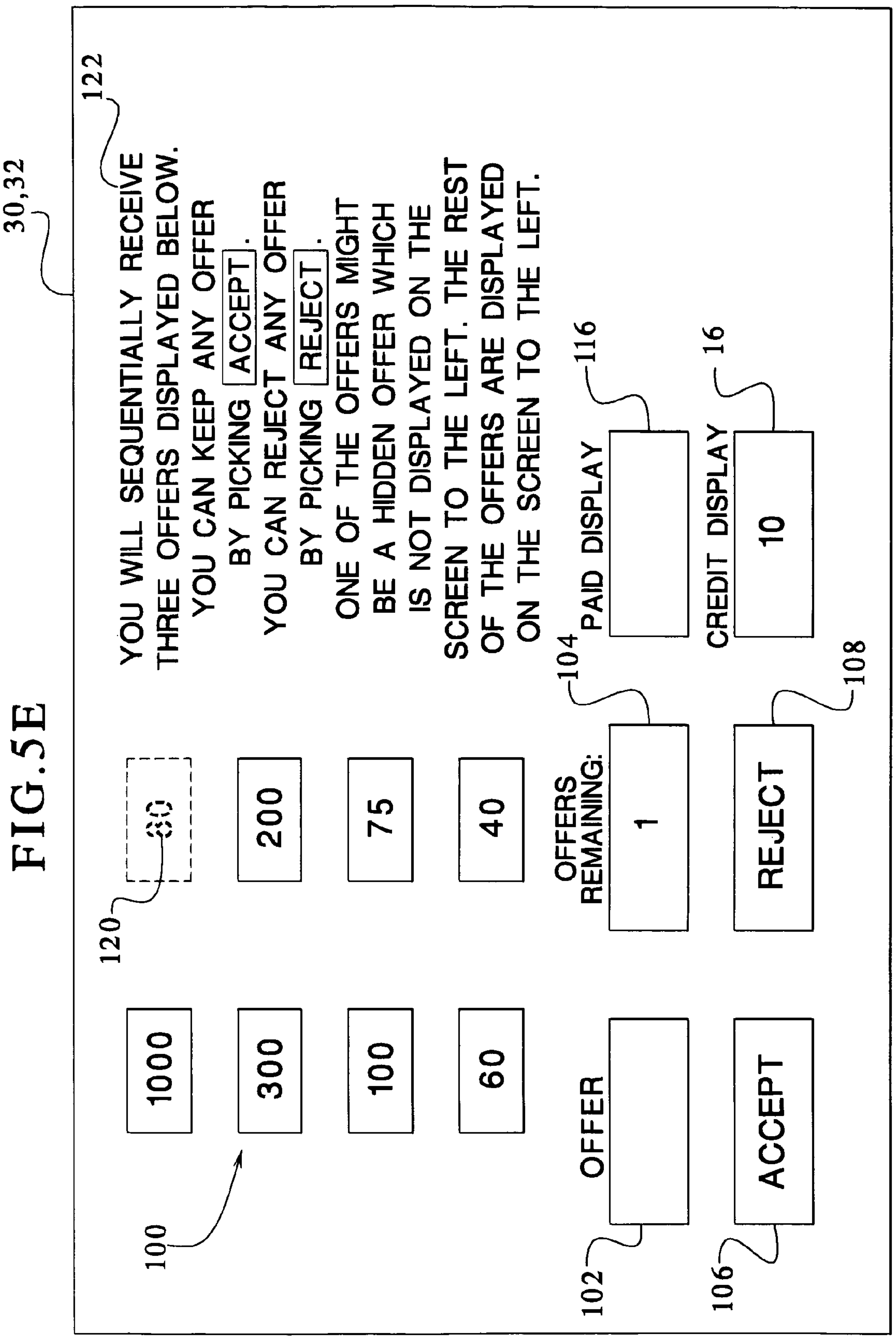

Referring now to FIG. 5B, upon the selection of a start-up input device (not shown) or after a predetermined amount of time, the game provides the displayed seventy-five offer 100 and decreases the offers remaining to two, whereby the player 118 rejects this offer. In FIG. 5C, the game randomly provides the hidden eighty offer 120 and decreases the offers remaining to one. The game displays the hidden offer of eighty in the offer display 102 and alternatively and additionally in the group of displayed offers 100. Alternatively as illustrated in FIG. 5E, the gaming device may make the hidden offer to the player without revealing the hidden offer on the display as shown in phantom or in the offer display 102. This embodiment alternatively includes not displaying the hidden offer to the player but rather, informing the player that the game has provided the hidden offer to the player. In either case, if the player rejects the hidden offer 120, the player can thereafter only accept a displayed offer 100.

In FIG. 5C, the player rejects the hidden offer 120 of eighty. In FIG. 5D, the game provides the displayed forty offer 100 and decreases the offers remaining to zero, whereby the player 118 rejects this offer. In FIG. 5D, the game no longer displays the hidden offer 120 in the group of displayed offers 100 as shown in phantom. Alternatively, the game continues to reveal, although not provide, the hidden offer after the player's rejection of the hidden offer 120.

Since no more offers remain, the game awards the forty award of the displayed offer 100 to the player, as illustrated in the paid display 116 and updates the player's total credits, as illustrated in the credit display 16. Had the game not provided the hidden offer 120 to the player in FIG. 4C, this embodiment includes revealing the hidden offer 120 at this point. This embodiment alternatively only displays or reveals the hidden offer upon providing it to the player.

The game preferably only keeps the hidden offer 120 open or available for one accept/reject selection as illustrated in FIGS. 5A through 5D. The game alternatively includes keeping the hidden offer 120 open or available for a predetermined or randomly determined number of accept/reject selections. This embodiment also includes the game randomly providing a plurality of hidden offers 120, which the game keeps open or available for one or a plurality of accept/reject selections. As illustrated, the game of this embodiment randomly selects which offer, if any, is the hidden offer 120. There does not necessarily have to be a hidden offer selection. This embodiment also includes weighting the offer selection, such that one offer selection is more likely to produce a hidden offer 120 than at least one other offer selection.

In an alternative embodiment of the present invention, an additional offer can be associated with the hidden offer. More specifically, the opportunity for the player to obtain another offer if the player rejects the hidden offer is associated with the hidden offer. In such instance, if the player decides to reject the hidden offer, the player will be provided with at least one additional offer selected from the displayed offers 100.

In a further alternative embodiment of the present invention, if the player rejects the hidden offer and the process of the gaming devices determines that the player should have accepted the hidden offer because the hidden offer is higher than the players previous offer than the gaming machine can provide the player with another opportunity to accept the hidden offer with a suitable indication that encourages the player to select the hidden offer. This alternative embodiment can compensate for player strategy in accepting or rejecting the offers provided to the player.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A memory device storing a plurality of instructions, that when executed by at least one processor if a triggering event occurs in association with a single play of a primary game operable upon a wager, cause a gaming device, for a single play of a secondary game, to:

(a) simultaneously individually display each of a plurality of different offers, each individually displayed offer having a value which is displayed in association with said offer, said displayed offers being displayed without displaying any indication of a separate predetermined hidden offer having a predetermined hidden value;

(b) select one of the displayed offers;

(c) indicate the selected displayed offer;

(d) enable a player to accept or reject said selected displayed offer;

(e) if the player accepts said selected displayed offer, award the player the selected displayed offer;

(f) if the player rejects said selected displayed offer and (b) to (g) are not repeated a designated number of times for the single play of the game, repeat (b) to (g), said designated number of times being at least one; and (g) if the player rejects said selected displayed offer after (b) to (g) are repeated the designated number of times for the single play of the game, provide the predetermined hidden value of the predetermined hidden offer to the player, wherein said predetermined hidden offer is independent from and different than said plurality of displayed offers.

2. The memory device of claim 1, wherein the plurality of instructions, when executed by the at least one processor, for the single play of the secondary game, cause the gaming device to reveal said hidden offer after acceptance or rejection of said displayed offers.

3. The memory device of claim 1, which is selected from the group consisting of a detachable cartridge, a disk, a random access memory, a read only memory and an application-specific integrated circuit.

4. A memory device storing a plurality of instructions, that when executed by at least one processor, if a triggering event occurs in association with a single play of a primary game operable upon a wager, cause a gaming device, for a single play of a secondary game, to:

(a) simultaneously display a plurality of different offers to a player, each displayed offer having a displayed value, said displayed offers being displayed without displaying any indication of a separate predetermined hidden offer having a predetermined hidden value;

(b) after simultaneously displaying the values of each of said displayed offers, enable the player to accept or reject said predetermined hidden offer without revealing the value of the predetermined hidden offer, wherein the predetermined hidden offer is independent from and different from the plurality of displayed offers;

(c) award the player the value of the predetermined hidden offer if the player accepts said predetermined hidden offer; and (d) if the player rejects said predetermined hidden offer:

(i) select one of the displayed offers, (ii) indicate the selected displayed offer;

(iii) enable the player to accept or reject said selected displayed offer, (iv) award the player the selected displayed offer if the player accepts said selected displayed offer, and (v) award the player another one of the displayed offers if the player rejects said predetermined hidden offer and said selected displayed offer.

5. The memory device of claim 4, which is selected from the group consisting of a detachable cartridge, a disk, a random access memory, a read only memory and an application-specific integrated circuit.

6. A gaming device comprising:

an input device;

a display device;

a processor; and a memory device which stores a plurality of instructions, which when executed by the processor, cause the processor to operate with the display device and the input device to:

(a) enable a player to play a single play of a primary game upon a wager; and (b) if a triggering event occurs in association with the single play of the primary game, for a single play of a secondary game:

(i) simultaneously display a value associated with each of a plurality of different potential offers to the player, said values being simultaneously displayed without displaying any indication of a separate predetermined hidden offer having a predetermined hidden value;

(ii) randomly determine an order of when to provide said value of said predetermined hidden offer and at least one of the displayed values of the potential offers to the player for acceptance or rejection, wherein the predetermined hidden offer is independent of each of the plurality of potential offers;

(iii) enable the player to accept or reject at least one of: said predetermined hidden offer and at least one of the potential offers, wherein which offer the player is enabled to accept or reject is based on the randomly determined order;

(iv) provide the player the predetermined hidden value of the predetermined hidden offer if the player is enabled to accept or reject the predetermined hidden offer and the player accepts said predetermined hidden offer; and (v) provide the player the value of one of the plurality of potential offers if the player is enabled to accept or reject at least one of the potential offers and the player accepts said potential offer.

7. The gaming device of claim 6, wherein when executed by the processor, said plurality of instructions cause the processor to provide a plurality of the potential offers to the player for acceptance or rejection.

8. A gaming device comprising:

an input device;

a display device;

a processor; and a memory device which stores a plurality of instructions, which when executed by the processor, cause the processor to operate with the display device and the input device to:

(a) enable a player to play a single play of a primary game upon a wager; and (b) if a triggering event occurs in association with the single play of the primary game, for a single play of a secondary game:

(i) cause a plurality of different offers to be simultaneously displayed, wherein each displayed offer has a displayed value, said displayed offers being displayed without displaying any indication of any of a plurality of separate predetermined hidden offers each having a predetermined hidden value;

(ii) select a first one of the displayed offers;

(iii) indicate the selected first one of the displayed offers;

(iv) after simultaneously displaying the displayed values of each of said displayed offers, simultaneously enable the player to accept or reject:

(A) said selected first one of the displayed offers, and (B) the predetermined hidden value of a first one of the plurality of predetermined hidden offers, each of the predetermined hidden offers being independent of each of the plurality of displayed offers;

(v) if the player rejects the predetermined hidden value of said first one of the displayed offers and said first one of the predetermined hidden offers, provide a second one of the displayed offers and a second one of the predetermined hidden offers to the player; and (vi) provide an award to the player based on each offer accepted by the player.

9. A gaming device comprising:

an input device;

a display device;

a processor; and a memory device which stores a plurality of instructions, which when executed by the processor, cause the processor to operate with the display device and the input device to:

(a) enable a player to play a single play of a primary game upon a wager; and (b) if a triggering event occurs in association with the single play of the primary game, for a single play of a secondary game:

(i) cause a plurality of different offers to be simultaneously displayed, wherein each displayed offer has a displayed value, said displayed offers being displayed without displaying any indication of a separate predetermined hidden offer having a predetermined hidden value;

(ii) select a first one of the displayed offers;

(iii) indicate the selected first one of the displayed offers;

(iv) after simultaneously displaying the values of each of said displayed offers, simultaneously enable the player to accept or reject:

(A) said selected first one of the displayed offers, and (B) said predetermined hidden value of said predetermined hidden offer, said predetermined hidden offer being independent of each of the plurality of displayed offers;

(v) if the player rejects said first one of the displayed offers and said predetermined hidden value of said predetermined hidden offer, provide a second one of the displayed offers to the player; and (vi) provide an award to the player based on each offer accepted by the player.

10. A method of operating a gaming device, said method comprising:

(a) enabling a player to play a single play of a primary game upon a wager; and (b) if a triggering event occurs in association with the single play of the primary game, for a single play of a secondary game:

(i) randomly selecting a first one of a plurality of different offers displayed on a display device, the values of which are each initially displayed, wherein each value of each displayed offer is individually displayed, said values being initially displayed without displaying any indication of a separate predetermined hidden offer having a predetermined hidden value;

(ii) indicating the selected first one of the displayed offers;

(iii) enabling the player to accept or reject the selected first one of the displayed offers;

(iv) if the player accepts said selected first one of the displayed offers, awarding the selected first one of the displayed offers to the player; and (v) if the player rejects said selected first one of the displayed offers:

(A) without displaying any indication of the predetermined hidden offer having the predetermined hidden value, randomly selecting a second one of the displayed offers, (B) enabling the player to accept or reject the selected second one of the displayed offers, (C) if the player accepts the selected second one of the displayed offers, awarding said selected second one of the displayed offers to the player, and (D) if the player rejects the selected second one of the displayed offers, awarding the predetermined hidden value of the predetermined hidden offer to the player, wherein said hidden offer is independent of and different than said plurality of displayed offers.

11. The method of claim 10, which includes randomly selecting the value of the hidden offer.

12. The method of claim 10, wherein a plurality of said displayed offers are simultaneously displayed on the display device to the player.

13. The method of claim 10, which includes randomly selecting one of a plurality of hidden offers and awarding said selected hidden offer to the player if the player rejects each selected displayed offer.

14. The method of claim 10, which is provided through a data network.

15. The method of claim 14, wherein the data network is an intemet.

16. A method of operating a gaming device, said method comprising:

(a) enabling a player to play a single play of a primary game upon a wager; and (b) if a triggering event occurs in association with the single play of the primary game, for a single play of a secondary game:

(i) initially simultaneously displaying a plurality of values on a display device, said values being simultaneously displayed without displaying any indication of a separate predetermined value;

(ii) sequentially selecting one of the plurality of values or said predetermined value, wherein said predetermined value is independent of and separate from said displayed values;

(iii) enabling the player to accept or reject the selected value without displaying the predetermined value on the display device if the predetermined value is selected;

(iv) if the player accepts said selected value:

(i) displaying the selected value on the display device if the selected value is the predetermined value, and (ii) awarding the selected value to the player; and (v) if the player rejects the selected value, repeating (ii) to (v) a predetermined number of times, wherein said predetermined number is greater than one.

17. The method of claim 16, which is provided through a data network.

18. The method of claim 17, wherein the data network is an internet.

* * * * *